US011976501B2

(12) United States Patent
Watanabe

(10) Patent No.: US 11,976,501 B2
(45) Date of Patent: May 7, 2024

(54) LID URGING STRUCTURE

(71) Applicant: NIFCO INC., Yokosuka (JP)

(72) Inventor: Yasuhiro Watanabe, Yokosuka (JP)

(73) Assignee: NIFCO INC., Yokosuka (JP)

( * ) Notice: Subject to any disclaimer, the term of this patent is extended or adjusted under 35 U.S.C. 154(b) by 820 days.

(21) Appl. No.: 17/047,235

(22) PCT Filed: May 30, 2019

(86) PCT No.: PCT/JP2019/021526
§ 371 (c)(1),
(2) Date: Oct. 13, 2020

(87) PCT Pub. No.: WO2019/235352
PCT Pub. Date: Dec. 12, 2019

(65) Prior Publication Data
US 2021/0164272 A1 Jun. 3, 2021

(30) Foreign Application Priority Data
Jun. 5, 2018 (JP) ................. 2018-107393

(51) Int. Cl.
E05B 83/34 (2014.01)
B60K 15/05 (2006.01)
B60L 53/16 (2019.01)

(52) U.S. Cl.
CPC .............. *E05B 83/34* (2013.01); *B60K 15/05* (2013.01); *B60L 53/16* (2019.02)

(58) Field of Classification Search
CPC ...... E05B 83/34; B60L 53/16; Y02T 10/7072; B60K 2015/053; B60K 1/04; B60K 15/05; F16C 11/04; F16F 1/04
See application file for complete search history.

(56) References Cited

U.S. PATENT DOCUMENTS 10,513,174 B2   12/2019   Watanabe

FOREIGN PATENT DOCUMENTS

JP   2005-343367 A   12/2005
JP   2014-121985 A   7/2014
(Continued)

OTHER PUBLICATIONS

WO-2017038833-A1 computer translation (Year: 2017).*
PCT/ISA/210, "International Search Report for International Application No. PCT/JP2019/021526," dated Aug. 27, 2019.

*Primary Examiner* — Amy R Weisberg
*Assistant Examiner* — Melissa Ann Bonifazi
(74) *Attorney, Agent, or Firm* — Manabu Kanesaka

(57) ABSTRACT

A lid urging structure includes a housing, a lid pivotally supported on the housing via a link member and switched among a closed position where the lid closes an opening in the housing, a first position in the middle of opening from the closed position, a second position located further in an opening direction, and a fully open position; and an urging member that urges the lid in a closing direction at the closed position and, when the lid is pivoted from the closing direction to the second position by overcoming the urging force, the urging direction is reversed, enables switching from the second position to the fully open position by the urging force. The urging member is formed of a plurality of springs disposed between the link member and the housing. The operating force and the urging force are adjusted by means of a balance between the springs.

8 Claims, 14 Drawing Sheets

(56) References Cited

FOREIGN PATENT DOCUMENTS

| | | | |
|---|---|---|---|
| JP | 2017-047827 A | 3/2017 | |
| JP | 2018-47717 A | 3/2018 | |
| WO | WO-2017038833 A1 * | 3/2017 | ......... B60K 15/0409 |

* cited by examiner

LID URGING STRUCTURE

TECHNICAL FIELD

The present invention relates to a lid urging structure.

BACKGROUND ART

FIG. 14 illustrates a vehicle lid device disclosed by the present applicant in a prior application (Patent Document 1). A lid device 7 in this figure includes a housing 1 that defines a refueling port space; a lid 2 that is rotatably supported with respect to the housing 1 by a linking member, and can be switched from a closed position where an opening of the housing is closed, to a second position that is partly open from the closed position, to a full-open position; and a urging member 6 that biases the lid 2 in a closing direction at the closed position, and enables switching from the second position to the full-open position through an urging force by reversing an urging direction at the second position when the lid 2 is rotated from the closing direction to the second position. Furthermore, a lid urging structure includes, in particular, the linking member formed of a first link 4A and a second link 4B; regulates the lid to a compact rotational trajectory; causes the urging force of the urging member 6 to operate between the two links 4A and 4B; uses the urging force to keep the lid from rattling in the closed position and the full-open position; and makes it so that, when unlocked in the closed position, the lid is lifted slightly against the urging force by a push lifter 16 so that the lid can be rotated by hand, or the like.

PRIOR ART DOCUMENT

Patent Document

Patent Document 1: Japanese Unexamined Patent Application Publication No. 2017-47827

SUMMARY OF THE INVENTION

Problem to be Solved by the Invention

In the lid urging structure described above, when a lid is rotated against an urging force from a full-open position to a second position by a lid closing operation, an urging direction of a spring body, which is an urging member, reverses and the lid forcefully collides with a push lifter due to being suddenly rotated from the second position to a closed position, and thus the lid is prone to fluttering and making abnormal sounds. This point is a serious problem because a prescribed torque is secured as a spring body torque so that the lid does not inadvertently flutter in the closed position.

Furthermore, as a different configuration, in a lid urging structure B in FIG. 13, a lid is switched from a closed position, to a first position that is partly open from the closed position, and to a second position and a full-open position further in an opening direction. The first position is the position at which the lid stops momentarily when rotated from the second position in a closing direction by an urging force, or the position at which an operating force is momentarily unnecessary when the lid is rotated in the opening direction from the closed position against the urging force. In the structure B, at the first position, a lid opening angle is small at only about 10 degrees. Therefore, in an operation that closes the lid, after the lid is rotated from the second position to the first position by the urging force and stops momentarily at the first position, the lid is once again rotated to the closed position by the urging force. As a result, since the lid opening angle at the first position is small at only about 10 degrees, the lid is prone to hitting a push lifter at high speed, thus making abnormal sounds and impairing a sense of quality.

A frictional resistance of an elastic member or a soft material, which are friction materials, has been used to attenuate a rotational speed of a lid as a countermeasure against this. However, the friction materials are not stable because the mechanical properties of the friction materials change with surface wear that generates frictional force, and with ambient temperature.

Objects of the present invention include resolving problems like those described above, enhancing a feeling of a lid opening and closing operation when compared to the past, and preventing fluttering and abnormal sounds when closing a lid without depending on frictional force. Other objectives will be made clear in the following descriptions.

Means for Solving the Problem

To achieve the object described above, the present invention is a lid urging structure that includes a housing that arranges a refueling port or an electric recharging port in an opening inner part; a lid that is rotatably supported with respect to the housing by a linking member, and can be switched from a closed position where an opening of the housing is closed, to a first position that is partly open from the closed position, to a second position further in an opening direction, and to a full-open position; and an urging member that biases the lid in a closing direction at the closed position, and that is able to switch through an urging force from the second position toward the full-open position by reversing an urging direction when a rotation operation is performed against the urging force from the closing direction (the closing direction is either the closed position, a first position vicinity between the closed position and the first position, or the first position, the same applying hereinafter) toward the second position; where the urging member is formed of a plurality of spring bodies arranged between the linking member and the housing, and wherein an equilibrium of each spring body adjusts an operating force that rotates the lid from the closed position to the first position or the first position vicinity against the urging force and an urging force that rotates and biases the lid from the first position or the first position vicinity to the closed position.

Thus, in the lid urging structure according the present invention, the lid can be switched by rotation from the closed position where the housing opening is closed, to the first position that is partly open from the closed position, and to the second position further in the opening direction and to the full-opening position. This point will be described with reference to FIG. 13. In FIG. 13, structures A through C1 are notations for abbreviating lid urging structures A through C1. FIG. 13 illustrates test examples of adjustments of a lid opening angle (degree) and a lid tip operating force (N) with respect to a structure A using spring bodies 6 and 7 as products according to the present invention, a structure B using a single spring body 6, and a structure C or C1 using a single spring body 7 or 7A as a comparison products. The lid urging structure A is a product according to the present invention that is the same as the morphological form. The lid urging structures B, C, and C1 are comparison products that differ from the morphological form only due to being configured of only one spring body.

Of these, the lids in structures C and C1 can be switched from a closed position, to a second position that is partly open from the closed position, and to a full-open position same as in Patent Document 1. In these structures, when a lid is rotated against an urging force from a full-open position to a second position by a lid closing operation, an urging direction of a spring body, which is an urging member, reverses and the lid forcefully collides with the push lifter 16 of Patent Document 1 due to being suddenly rotated from the second position to the closed position. This point is a serious problem in cases where a prescribed torque is secured as spring body torque so that the lid does not inadvertently flutter in the closed position (problem 1 of the present invention).

By contrast, in the structures A and B, the lids are switched from a closed position, to a first position that is partly open from a closed position, to a second position further in an opening direction, and to a full-open position. Thus, the second position is the same as in the structures C and C1 and inside a lid opening angle when a spring body urging direction reverses, and is thus a lid position when a spring body urging direction reverses upon operation of the lid against an urging force toward a closing direction from the full-open position, and the lid is then rotated in the closing direction by the urging force. In this example, the lid opening angle is about 50 degrees. Furthermore, the first position is the position at which the lid stops momentarily when rotated from the second position in a close direction by the urging force, or the position at which an operating force is unnecessary when the lid is rotated in the opening direction from the closing position against the urging force. The lid angle is about 25 degrees at the first position in the structure A and about 10 degrees at the first position in the structure B.

Incidentally, for either of the structures A or B, in an operation that closes the lid, after the lid is rotated in the closing direction from the second position by the urging force, and after stopping momentarily at the first position, the lid is once again rotated to the closed position by the urging force. In such cases, if the lid opening angle at the first position is small at only about 10 degrees, as with structure B, there is a problem in that the lid is prone to hitting a push lifter at high speed, rendering the lid difficult to use and impairing a sense of quality (problem 2 of the present invention). By contrast, since the lid opening angle at the first position has been significantly modified to about 25 degrees in the structure A, which is a product according to the present invention, the structure can eliminate and alleviate such problems by reducing tapping sounds and fluttering, and is thus effective in providing a sense of quality and preventing finger pinching.

Note that the reason "the lid from the closed position to the first position or the first position vicinity" and "the lid from the first position or the first position vicinity" are specified, that is, the reason "the first position vicinity" in addition to "the first position" is added in the present invention is as described below. For example, in the lid closing operation in FIG. 13, when the lid is rotated from the second position to the first position (where the lid opening angle is 25 degrees) by the spring body urging force, the lid momentarily stops at the first position and is once again biased in the closing direction at a lid opening angle of about 20 degrees. In other words, the reason is to account for a time lag associated with such an urging direction reversal.

The present invention as described above may be embodied according to the following aspects.

(A) A configuration where the linking member is made up of a first link and a second link, one end side of which is pivotally supported against a back side of the lid while the other end side is pivotally supported against an inside of the housing; and the spring body includes a first spring body arranged between the first link and the housing and a second spring body arranged between the second link and the housing side. Since, according to this aspect, the linking member is formed of two links, the lid can easily be regulated to a compact rotational trajectory, in the same way as in Patent Document 1. Additionally, since the present invention includes the first spring body arranged between the first link and the housing and the second spring body arranged between the second link and the housing as a lid urging structure, rattling can be prevented in each of the links, the lid opening angle at the first position can easily be made bigger as can be deduced from FIG. 13, and a lid opening and closing operation feeling can be set in various ways according to purposes.

(B) A configuration where the use of the first spring body and the second spring body allows the lid opening angle to be set larger at the first position when compared with cases using the first and second spring bodies independently. Since, as can be seen from FIG. 13, the lid opening angle at the first position can be set larger when the first and second spring bodies are used according to this aspect than in a configuration where the first and second spring bodies are used independently, it becomes easier in, for example, a lid closing operation to alleviate an impact during opening proportional to the distance or rotation angle from the first position to the closed position, thus making it possible to enhance a sense of quality by reducing conventional tapping sounds and fluttering.

(C) A configuration that includes a base provided inside the housing that pivotally supports the first link and the second link and regulates a corresponding end part side of the spring body. According to this aspect, pivotally supporting the links and arranging the spring base between the lid and the base makes it possible to maintain good lid handling properties, ease of incorporation into the housing, and good appearance characteristics.

(D) A configuration where the first link includes an upper plate part pivotally supported by the lid, a middle plate part linked to the upper plate part and pivotally supported by the base, and an arm part in which a fitting hole is formed penetrating in a width direction linked to the middle plate part, and where the first spring body is arranged between the arm part and an inner wall of the base provided so as to face the arm part, with one end of the spring body being regulated to fit into the fitting hole and the other end being regulated to fit into a fitting hole provided in the inner wall.

(E) A configuration where the second link includes a plate body pivotally supported by both the lid and the base, a pair of projecting leg parts for keeping an interval in a lower side of the plate body at intervals, and a groove part provided on a back surface side of the leg parts, and where the second spring body is arranged on an inner surface side of the base, with one end of the spring body being regulated to fit into the groove part for one of the leg parts and the other end being regulated to fit into a fitting hole provided on the base penetrating in a vertical direction. Since, according to these aspects (D) and (E), the links are simplified, and one end of each of the spring bodies is positioned and regulated to a corresponding link while the other end is positioned and regulated to a part corresponding to the base, assembly is made easy and rattling between members is reliably absorbed.

(F) The spring bodies described above are coil springs. These coil springs include torsion springs that include coil parts. Using simple and versatile coil springs as the spring bodies, according to this aspect, allows implementation at a low cost.

Effect of the Invention

In the present invention, an equilibrium of spring bodies makes it possible to more optimally set a size of an operating force for rotating a lid from a closed position to a first position or a first position vicinity and a size of an urging force urging so as to rotate the lid from the first position or the first position vicinity to the closed position than in a configuration using one spring body. As a result, a sense of a lid opening and closing operation can be enhanced.

BRIEF DESCRIPTION OF THE DRAWINGS

FIG. 1(a) is a schematic drawing illustrating a lid closed position, and FIG. 1(b) is a schematic drawing illustrating a lid full-open position.

FIG. 3(a) and FIG. 3(b) illustrate the lid in FIG. 2 upside down.

FIG. 5(a) and FIG. 5(b) illustrate the closed position and the first position in FIG. 4.

FIG. 6(a) and FIG. 6(b) illustrate the second position and the full-open position in FIG. 4.

FIG. 12(a) is a structural view of a comparison product 1 that uses only the first spring body, and FIG. 12(b) is a structural view of a comparison product 2 that uses only the second spring body.

DESCRIPTION OF THE PREFERRED EMBODIMENTS

Figure 1A:
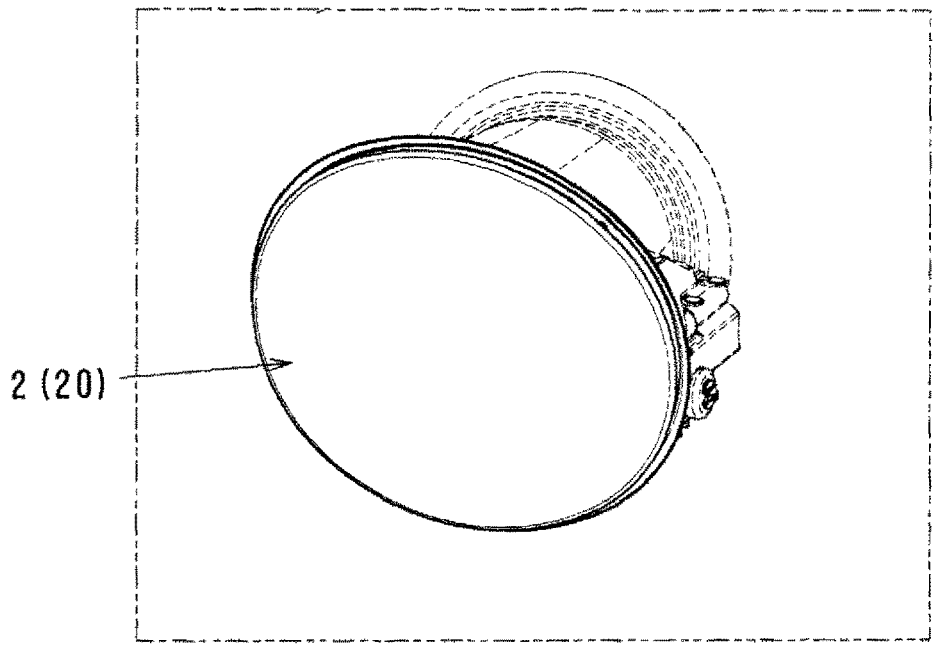
FIGS. 1(a) and 1(b) illustrate the application of the lid urging structure of one aspect according to the present invention where

Embodiments according to the present invention will be described with reference to the attached drawings. In this description, operational characteristics will be discussed after a detailed description of the lid urging structure according to the present invention with reference to FIG. 1(a) through FIG. 11. Note that the drawings, especially FIGS. 5(a) and 5(b) and FIGS. 6(a) and 6(b), are schematized due to drawing restrictions.

(Lid Urging Structure) In FIG. 1(a) through FIG. 11, the lid urging structure includes an approximately container-shaped housing 1 with an upper opening that defines a refueling port part; a lid 2 that is connectably supported with respect to the housing 1 by a first link 4 and a second link 5 as a linking member, and can be switched from a closed position where an opening of the housing 1 is closed, to a first position that is partly open from the closed position, to a second position and a full-open position further in an opening direction; and a plurality of spring members 6 and 7 that are urging members that bias the lid 2 in a closing direction at the closed position, and enable switching from the second position to the full-open position through urging forces by reversing urging directions when a rotation operation is performed against the urging force from the closing direction to the second position.

Figure 13:
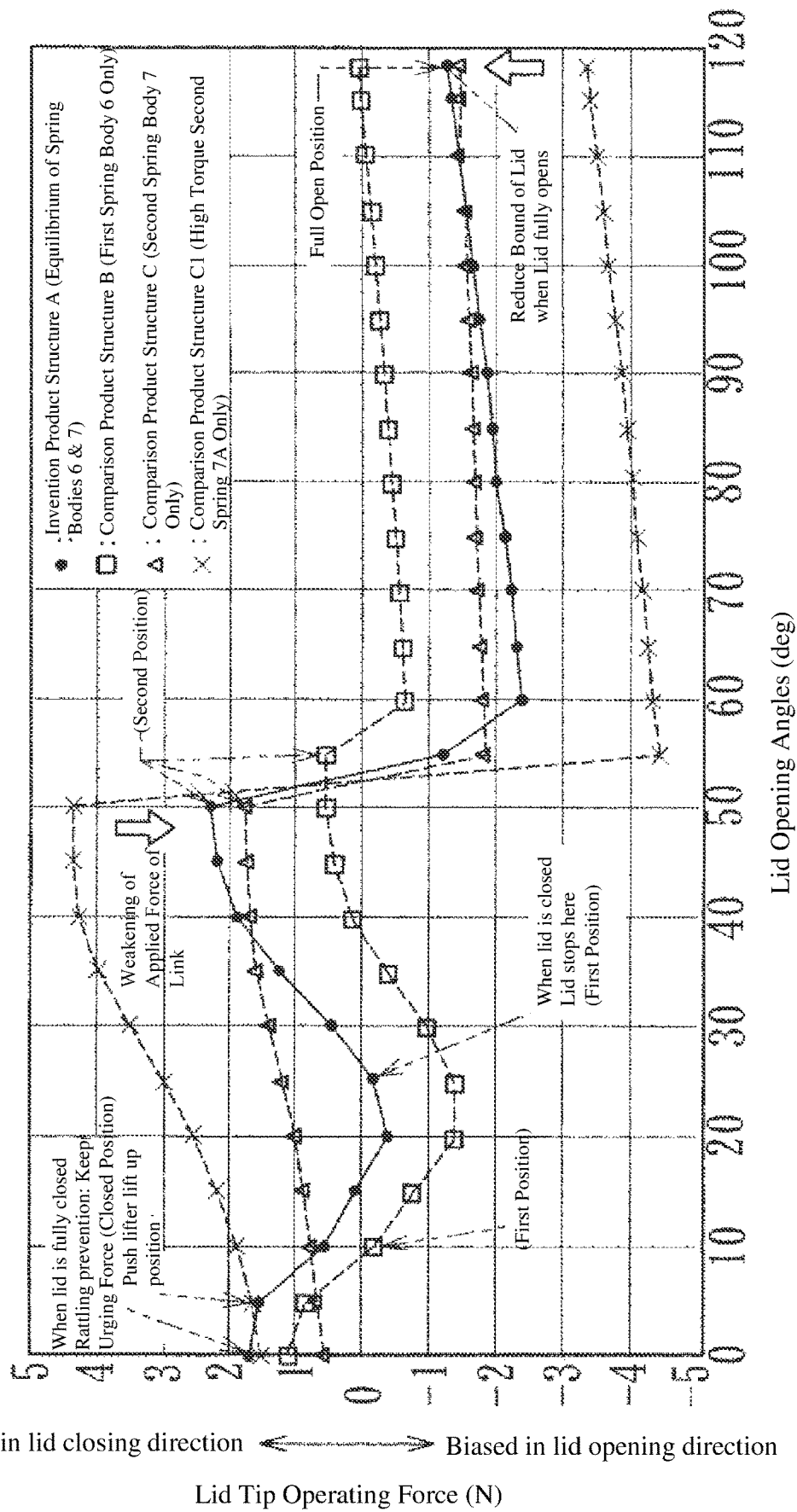
FIG. 13 is a graph showing relationships between lid end operating forces (N) and lid opening degrees of the embodiment product and the comparison products 1 and 2.
Figure 14:
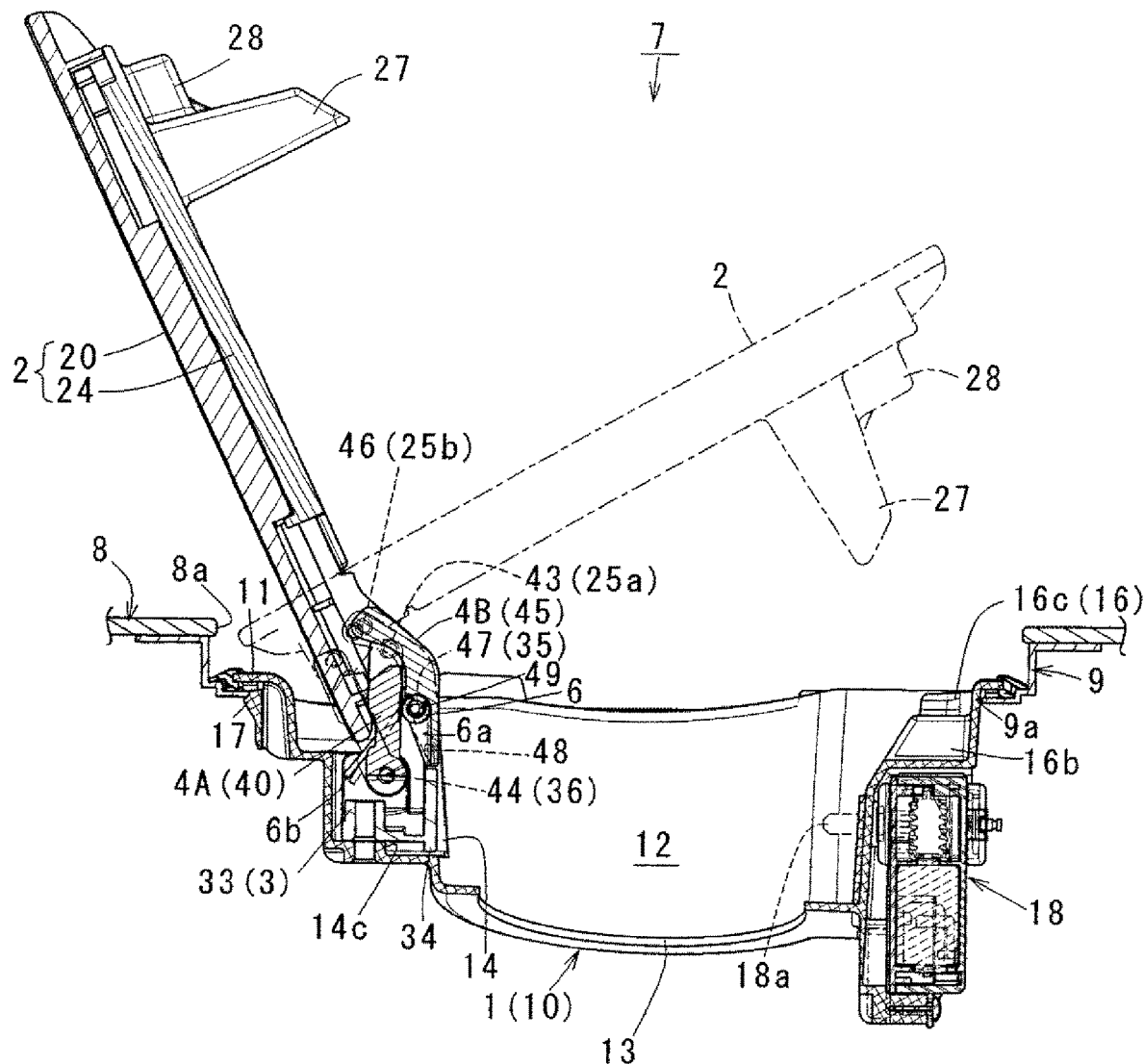
FIG. 14 is a cross sectional view illustrating the lid urging structure disclosed in Patent Document 1.

In other words, the lid 2 is rotatably supported with respect to a base 3 provided inside the housing 1 through the first link 4 and the second link 5. The first spring body 6 is arranged between the first link 4 and the base 3, and the second spring body 7 is arranged between the second link 5 and base 3. Furthermore, the lid 2 is locked in the closed position in FIG. 1(a) by locking means 18 mounted on an outer circumference of the housing 1. For example, when the locking means 18 is unlocked through a car door opener unlocking operation or a door lock release operation, the lid 2 is opened a little from the closed position against an urging force of the first spring body, or the like, by a push lifter 17 (as illustrated in FIG. 13, a lid opening angle is about 6 degrees). Thus, when the lid 2 is rotated by hand, or the like, to the second position in the opening direction, the urging direction of the second spring body 7, or the like, is largely reversed at the second position, and the lid is subsequently rotated in the opening direction by the urging force. These details are clarified below.

Note that the housing 1, the lid 2 (lid body 20 and supporting body 25), the base 3, the first link 4, and the second link 5 are all resin injection molded products. However, the materials thereof may be other than resin.

First, the housing 1 includes a flange part 11 that protrudes into an upper inner circumference of a cylindrical part 10. Furthermore, the cylindrical part 10 includes a through hole 13 provided in a bottom wall, a concave part 14 that is provided on an inner circumference and is large enough to accept the base 3, a cavity part 15 formed one level lower on upper left and right sides of the concave part 14, a cavity part 16 formed one level lower in a location on an inner circumference and facing the concave part 14, and a push lifter 17 assembled to an outer circumference for slightly lifting, from the closed position, the lid 2 and the locking means 18 locking the lid 2 in the closed position.

Figure 8:
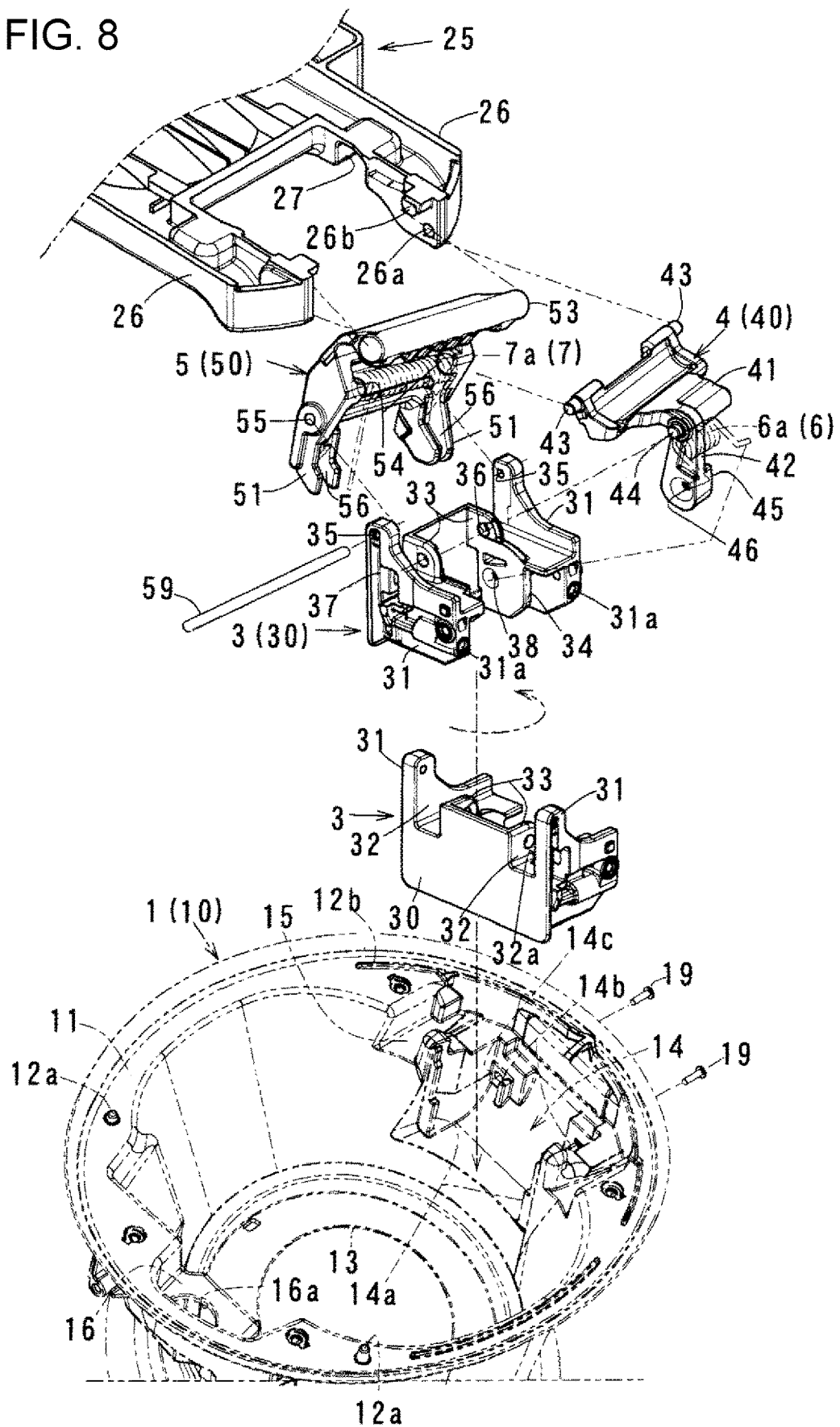
FIG. 8 is a schematic exploded view illustrating a support structure for the lid and a member configuration thereof.

Within the housing, a plurality of protrusions 12a and curved ribs 12b, or the like, protrude in the flange part 11 in order to accept the lid 2 as illustrated in FIG. 8. For example, a linking tube extending toward a fuel tank side not illustrated in the figure is connected to the through hole 13. Furthermore, a refueling operation is performed with a refueling nozzle inserted into the through hole 13 and the linking tube through a refueling port that is an upper opening in the cylindrical part 10.

The concave part 14 includes engaging ridges 14*a*, the upper sides of which connect to the cavity part 15 extending up and down, respectively, facing each other; holding protrusions 14*b* protruding toward a back side for positioning the base 3; and a mounting hole 14*c* that penetrates to the outside provided between an inner surface and the holding protrusion 14*b*.

Figure 3A:
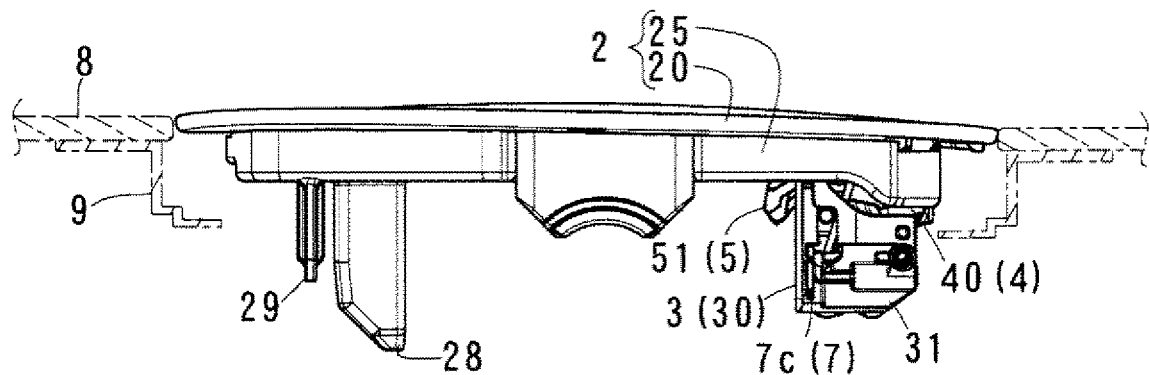
FIGS. 3(a) and 3(b) illustrate a front surface view and right end surface view where
Figure 3B:
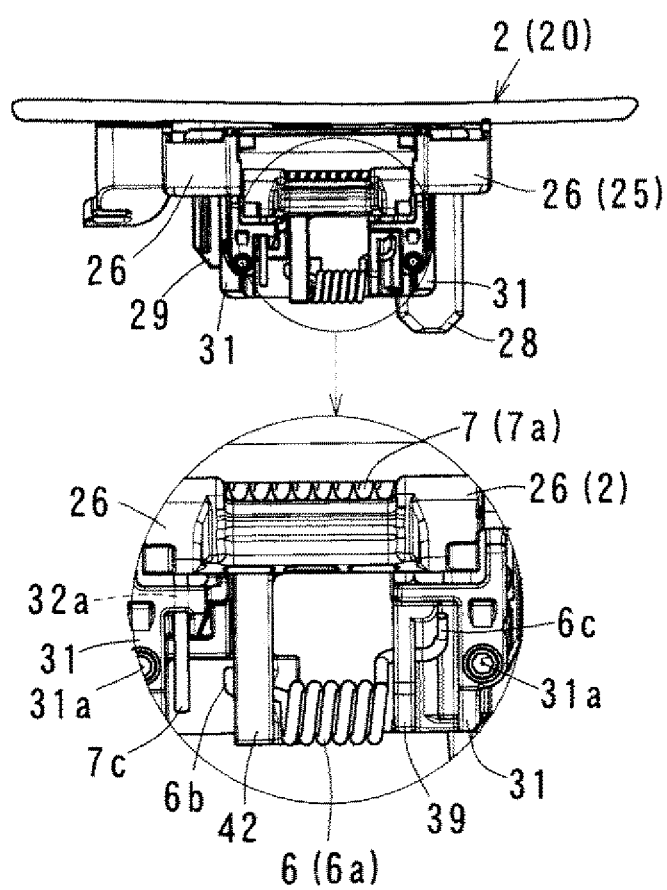
Figure 4:
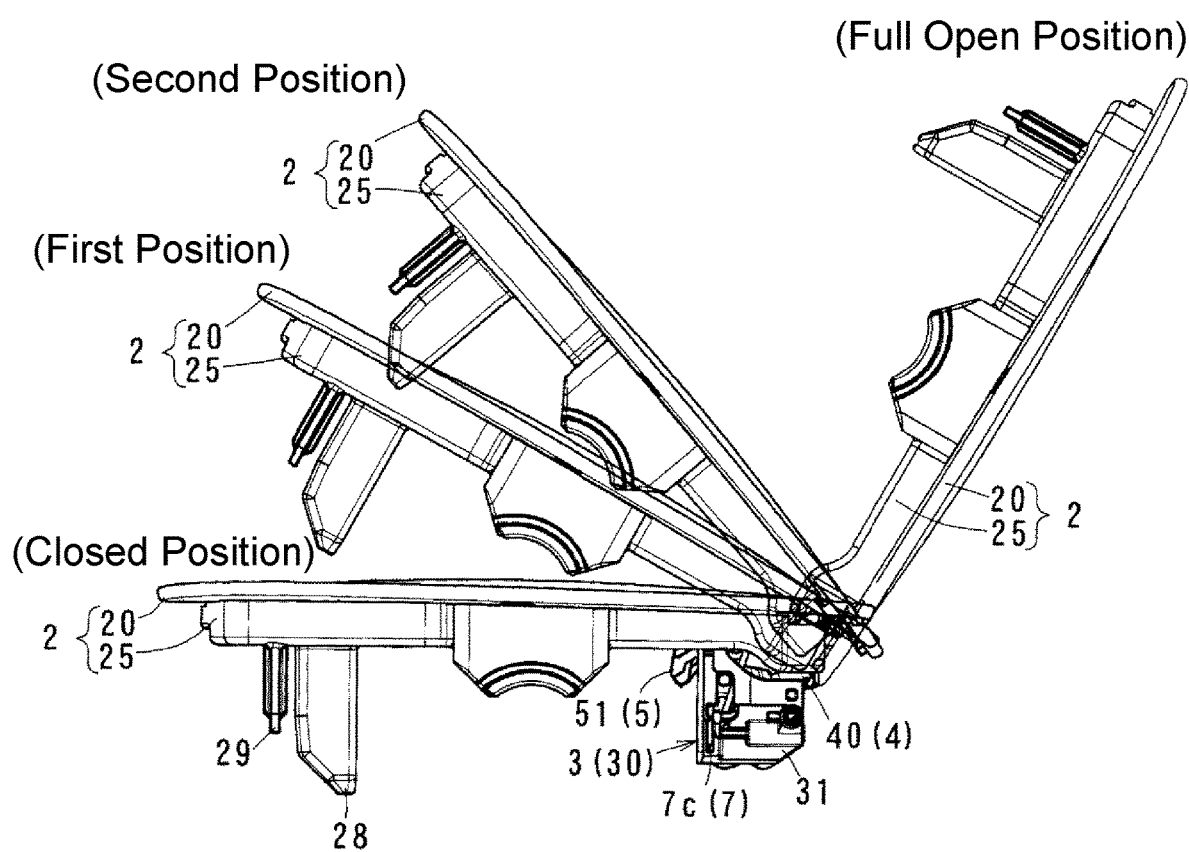
FIG. 4 is a schematic operation diagram for describing a movement of the lid.
Figure 5A:
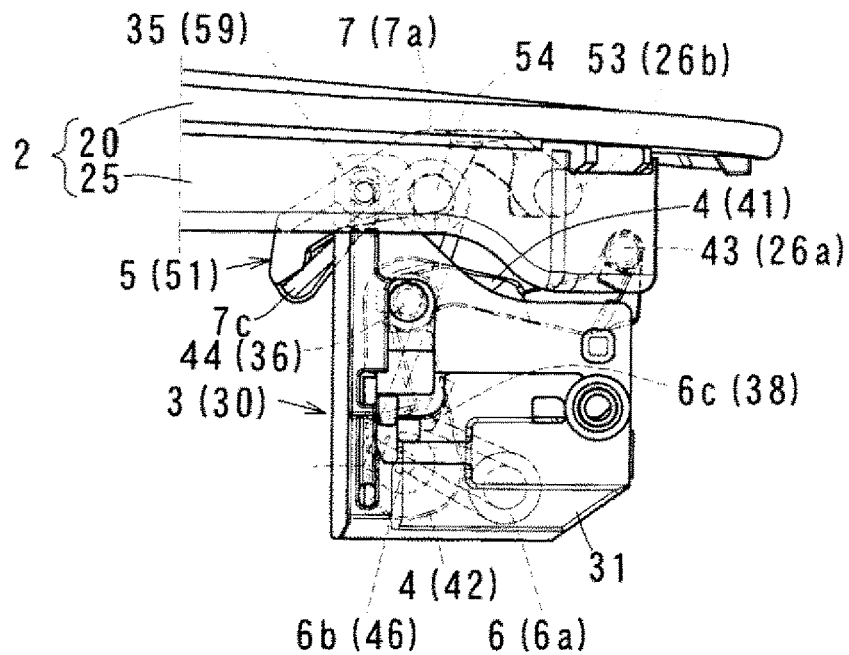
FIGS. 5(a) and 5(b) are a magnified views schematically illustrating main components of a lid urging structure where
Figure 5B:
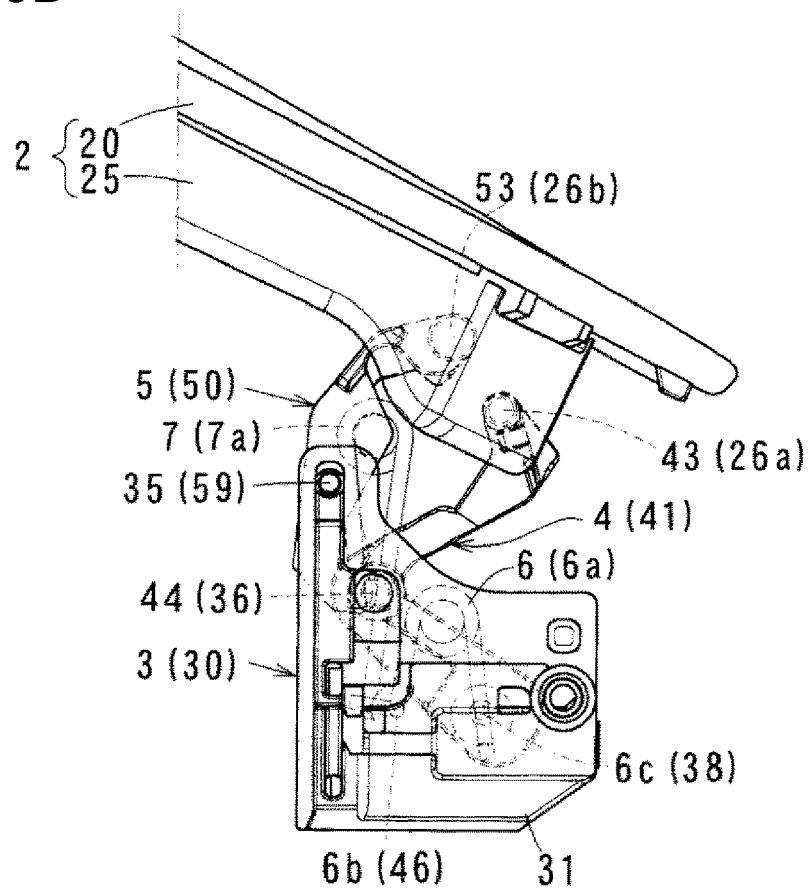

As can be deduced from FIG. 1 (*b*), the cavity part 15 is the location where a base end side of the lid 2 is released when the lid 2 is rotated to the full-open position. A through hole 16*a* that allows a push 17*a* of the push lifter 17 to protrude inwardly from the outside is provided in the cavity part 16. The push lifter 17 is disclosed in Japanese Unexamined Patent Application Publication No. 2015-105062, and the like, and enables a lid front end side to be grabbed by a finger, or the like, by causing the push 17*a* to protrude and slightly push up and float the lid 2 when the lid 2 is opened. A through hole not illustrated in the figure that allows a locking member 18*a* of the locking means 18 to protrude inwardly from the outside is provided near the cavity part 16. Furthermore, the locking means 18 is mounted on an outer circumference of the housing and locks the lid 2 closed when the locking member 18*a* protrudes from the through hole and switches to open the lid 2 when the member exits the through hole. As illustrated in FIG. 3(*a*), the housing 1 described above holds the lid 2 in an assembled state against an attaching frame 9 mounted inside an opening in an outer panel 8 of a vehicle body.

Figure 11:
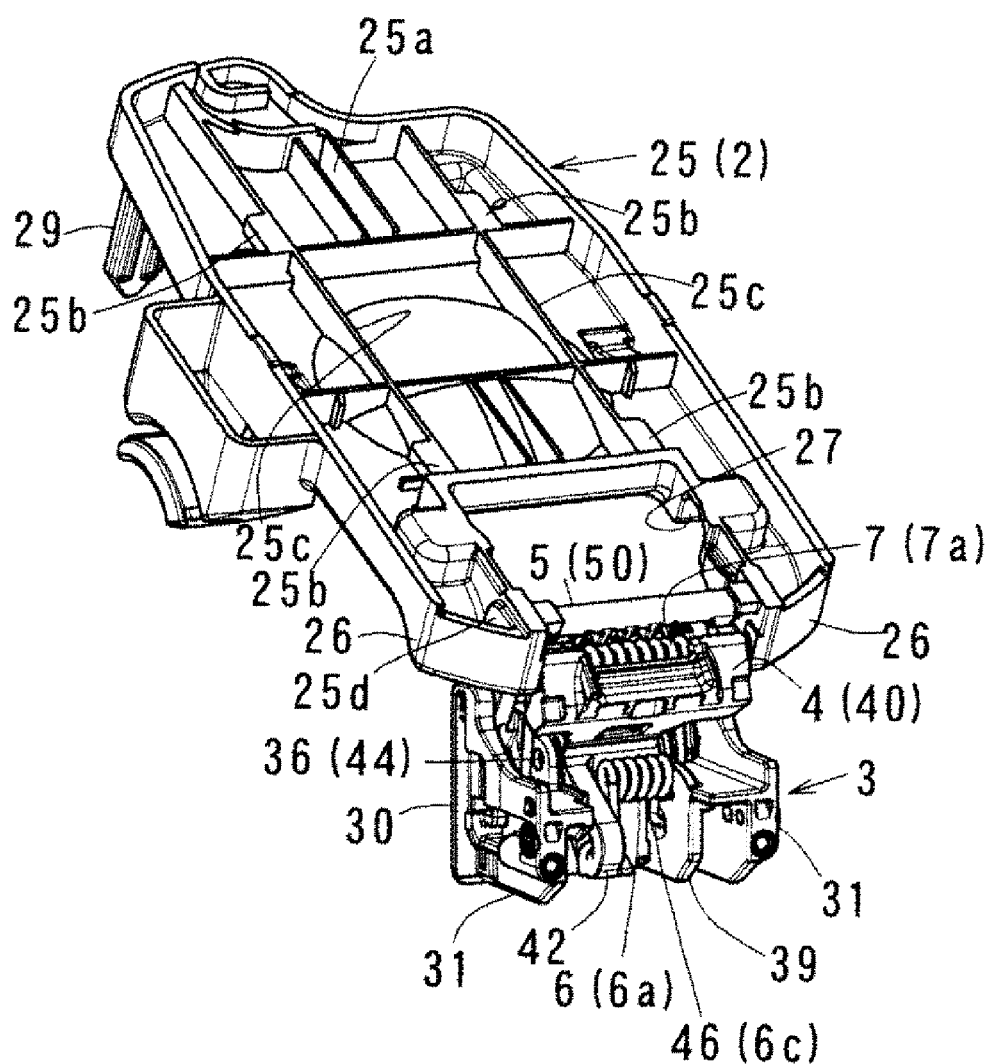
FIG. 11 is a structural view illustrating an embodiment product used in a lid opening and closing operation sensing test.
Figure 12A:
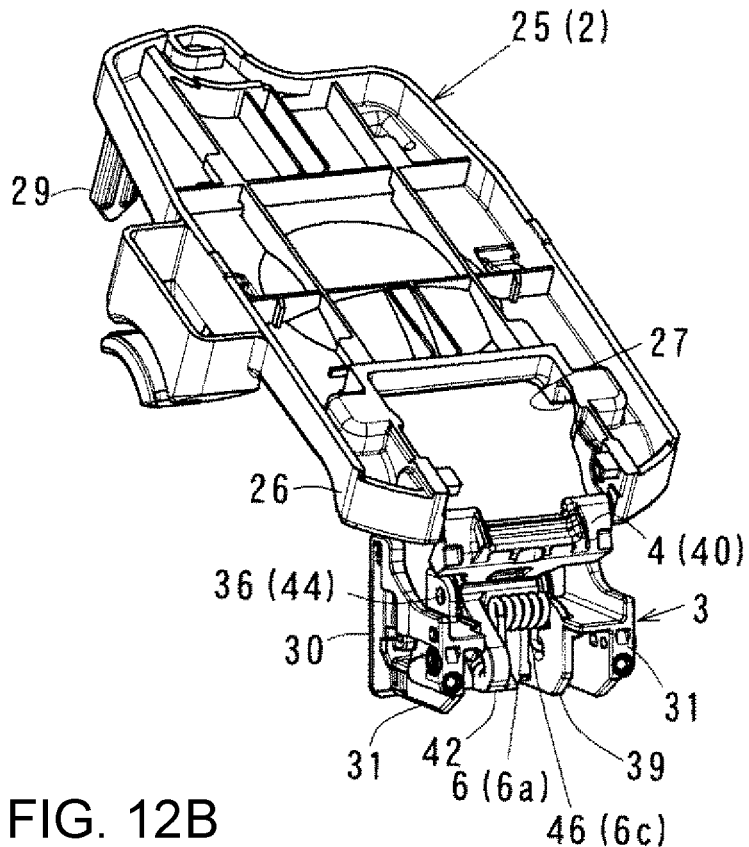
FIGS. 12(a) and 12(b) illustrate comparisons product used in lid opening and closing operation sensing tests, where
Figure 12B:
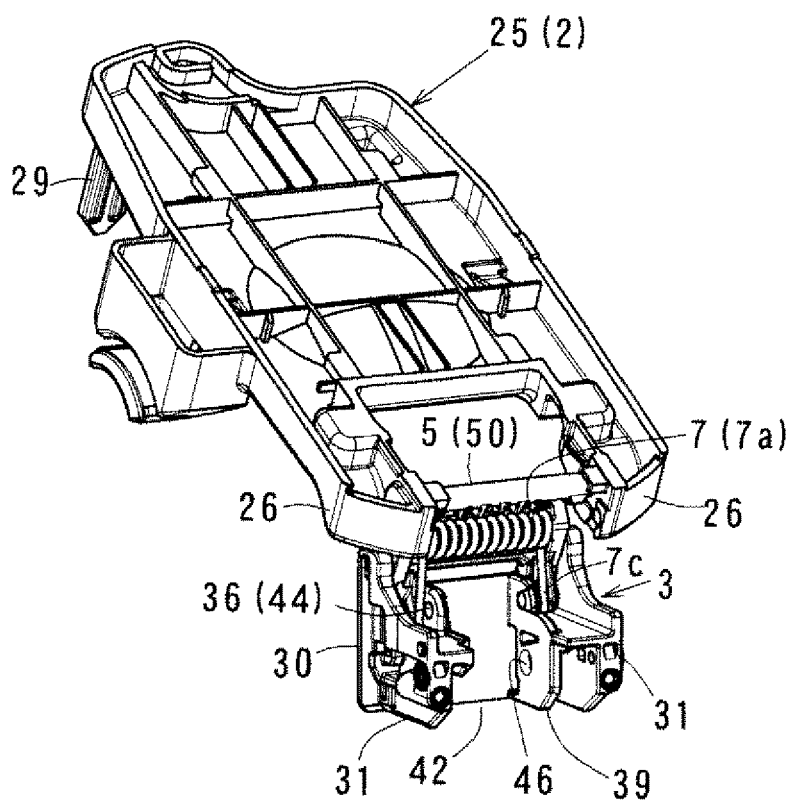

The lid 2 is made up of a lid body 20 and a supporting body 25. As illustrated in FIG. 3(*a*), the lid body 20 is disc-shaped and fits in the opening of the outer panel 8. A plurality of positioning protrusions 21 and 24 and linking engaging pieces 22 and 23 are provided on a back surface of the lid body 20. A pair of arm parts 26 is formed on a back side of the supporting body 25. Each of the arm parts 26 becomes slightly thicker from the middle front to back to an end. A shaft hole 26*a* and a shaft hole 26*b* are provided on opposing inner surfaces of each arm part 26, positioned front to back, each on a coaxial line. As illustrated in FIG. 11, a concave part 25*a* for positioning the protrusion 21, an engaging part 25*b* for engaging each of the engaging pieces 22, an engaging part 25*d* for engaging each of the engaging pieces 23, and a rib 25*c* for engaging each of the protrusions 24, and the like, are provided on an upper surface of the supporting body 25. An escape concave location 27 provided in part of each of the arm parts 26, and an engaging piece 28 and a regulating piece 29 that protrude forward are provided on a lower surface of the supporting body 25.

Furthermore, the supporting body 25 is mounted to the lid body 20 by engaging the protrusion 21 with the concave part 25*a*, each of the engaging pieces 22 with the engaging part 25*b*, each of the engaging parts 23 with the engaging part 25*d*, and each of the protrusions 24 with the rib 25*c*. The engaging piece 28 includes a locking hole 28*a* that penetrates front to back, and the lid 2 is locked in the closed position when the locking member 18*a* engages with the locking hole 28*a*. The regulating piece 29 regulates inadvertent swinging of the lid 2 by making contact with a corresponding inner surface inside the housing 1 at the closed position of the lid 2.

Figure 9A:
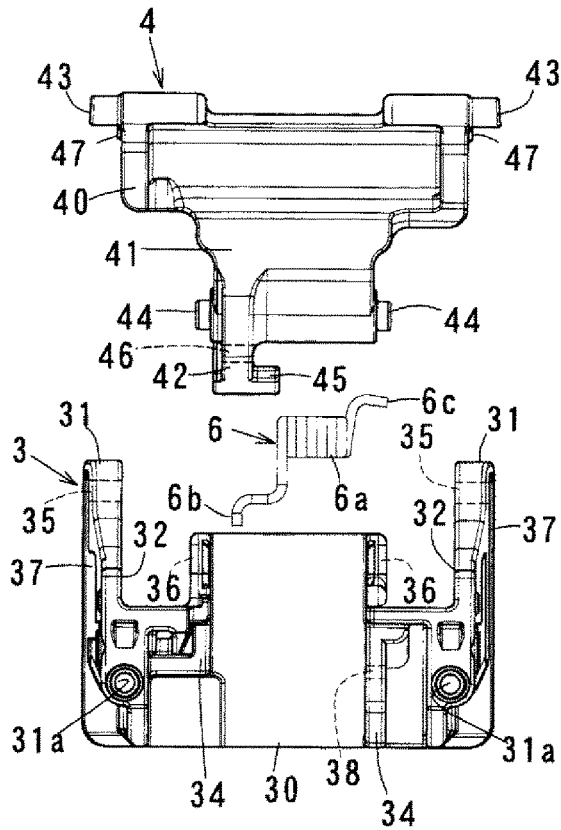
FIG. 9(a) illustrates a front surface view illustrating a relationship between a base, a first link, and a first spring body.
Figure 9B:
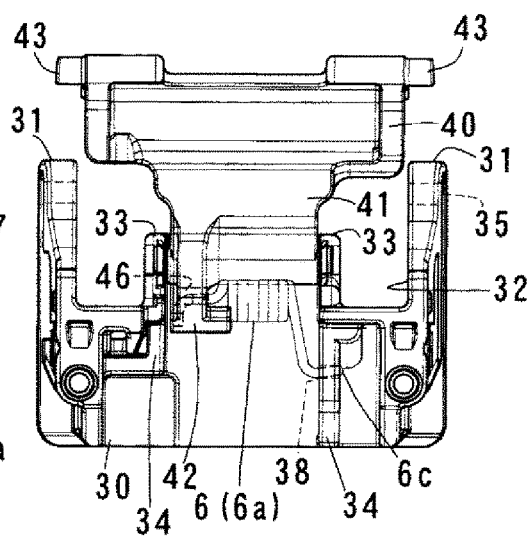
FIG. 9(b) illustrates a front surface view illustrating the relationship in an assembled state.
Figure 9C:
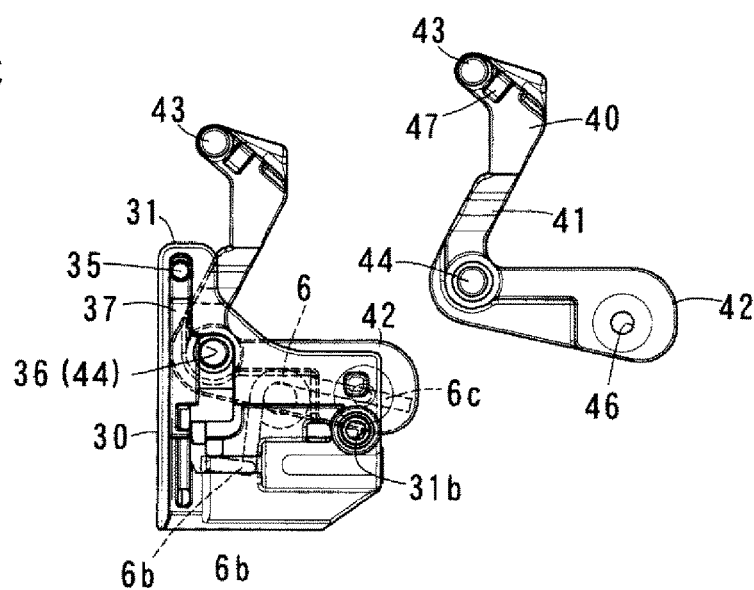
FIG. 9(c) illustrates a side surface view of the assembled state.

The base 3 is shaped like a block that fits into the concave part 14 and, as illustrated in FIG. 8 through FIG. 10(*c*), and includes a back wall 30 that forms a design surface, side walls 31 and 31 linked to both sides of the back wall 30, and protruding inner walls 33 and 33 positioned above the back wall 30 to keep an interval 32 between both of the side walls 31. Both of the side walls 31 are highest on the back wall side, have a front side arranged at the back of the concave part 14 that is lower, and include a vertical groove 37 provided in a high location on the back wall 30 side, a through hole 35 provided above the vertical groove 37 for the insertion and support of a shaft 59, and a mounting hole 31*a* provided on a front side end surface, and the like. Both of the inner walls 33 include a shaft hole 36 that penetrates on a coaxial line, and a wall part 34 extending downwardly to keep an interval with the side wall 31. One of the wall parts 34 is long and extends to the same position as a lower surface of the side wall 31 while the other is cut short. A fitting hole 38, into which the other end 6*c* of a first spring body 6 fits, is provided in the long wall part 34. A fitting hole 39 that penetrates vertically and into which the other end 7*c* of the second spring body 7 fits is provided in a bottom surface between one of the side walls 33 in a location close to the back wall 30 (see FIG. 10(*a*) through FIG. 10(*c*)).

The base 3 described above is pushed against the concave part 14 so that the groove parts 37 on both sides fit onto the protruding ridges 14*a*. This positions the base 3 in a state where a front lower corner part of each of the side walls 31 is sandwiched between a concave inner surface and the regulating protrusion 14*b*, and mounts the base in the concave part 14 by fitting the protruding ridge 14*a* into the groove part 37. The base 3 is designed so as not to be inadvertently removed from the concave part 4 by a fastener 19 subsequently being screwed into the mounding hole 31*a* through the mounting hole 14*c* from outside the housing 1. However, this type of fastener 19 may be omitted.

The first link 4 and the second link 5 rotatably support the lid 2 or the supporting body 24 with respect to the base 3. As illustrated in FIG. 8 and FIG. 9(*a*) through FIG. 9(*c*), of these, the link 4 includes a roughly rectangular upper plate part 40, a middle plate part 41 that is linked to a lower side of the upper plate part 40 and is narrower than the upper plate part 40, and an arm part 42 that is linked to the middle plate part 41 and extends roughly horizontally. The upper plate part 40 is provided with a shaft part 43 that protrudes on a coaxial line from both side surfaces, and a small protrusion 47 that protrudes below the shaft part 43. The middle plate part 40 is provided with a shaft part 44 that protrudes on a coaxial line from both lower side surfaces. The arm part 42 includes a flange-shaped part 45 protruding roughly at a right angle from one side of the middle plate part 40 provided on an inner surface side thereof, and a fitting hole 46 that penetrates in a tip width direction.

By fitting a dual shaft part 44 in the corresponding shaft hole 36, the first link 4 described above is rotatably supported by the base 3. The first spring body 6 is thus assembled to the first link 4 and the base 3. In other words, the first spring body 6 is a coil spring where one end 6*b* of a coil part 6*a* is regulated to fit into the fitting hole 46 on an arm part side, and the other end 6*c* of the coil part 6*a* is regulated to fit into the fitting hole 38 on a base side and generates a urging force.

For the first link 4 described above, each of the upper side shaft parts 43 is fitted into and linked in the shaft hole 26*a* to rotate freely with respect to the supporting body 25. Note that, in a process where the first link 4 rotates with the shaft part 44 fitted into the base side shaft hole 36 as a fulcrum, the small protrusion 47 makes it easier to reduce frictional resistance and absorb rattling by making contact with, for example, an opposing part of the base 3.

Figure 1B:
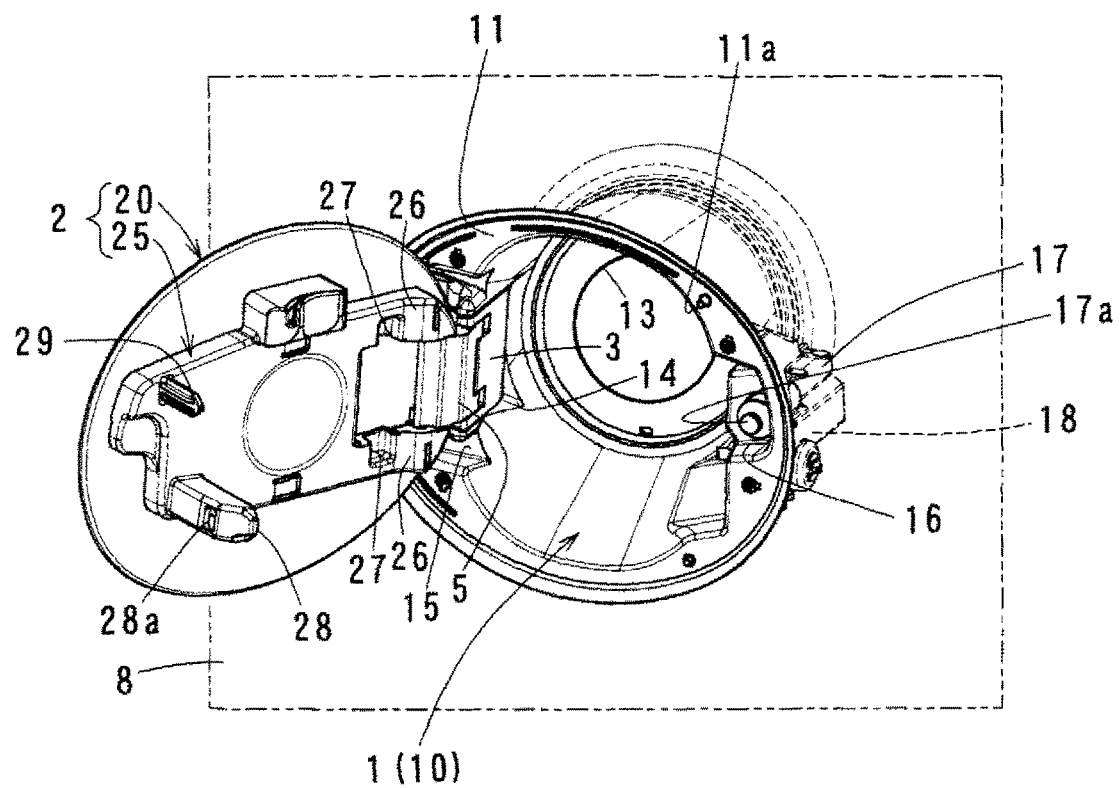
Figure 2:
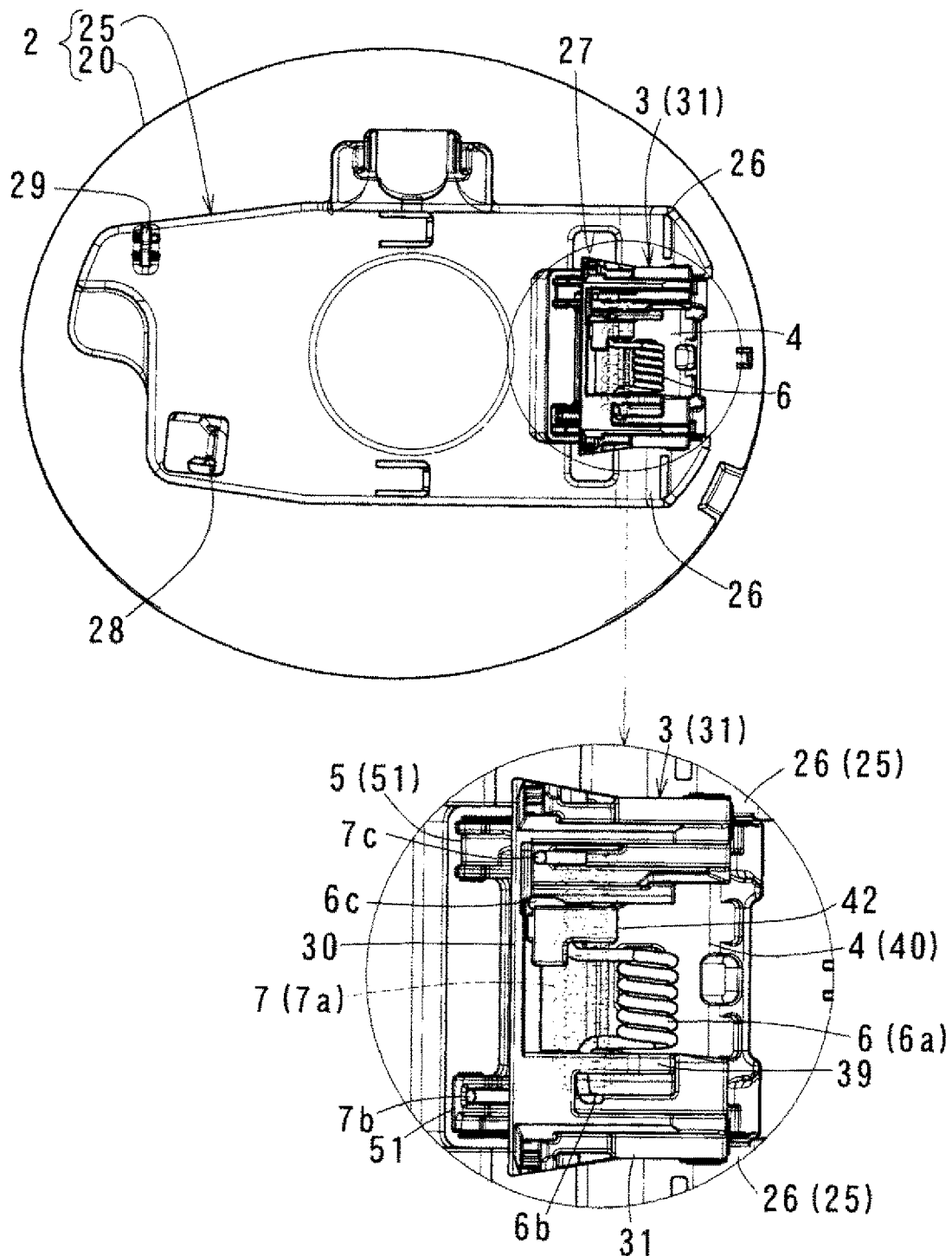
FIG. 2 is a view of a lid back surface viewed from a lid back side at the lid closed position.

As illustrated in FIG. 8 and FIG. 10(a) through FIG. 10(c), the second link 5 includes a plate body 50 that has a roughly "<" shape when viewed from the side, and a pair of protruding leg parts 51 that protrudes so as to keep a prescribed interval on a lower side of the plate body 50. As illustrated in FIG. 1(b), the plate body 50, in the full-open position of the lid 2, has an outer surface formed into a flat surface (design surface) arranged on a refueling port side, with an opposing inner surface provided with a large number of ribs on an upper side and a cavity formed on a lower side. A shaft part 54 for holding a spring protrudes in the cavity on a coaxial line into both inner surfaces. The plate body 50 also includes shaft parts 53 and 53 that protrude in a coaxial line above both side surfaces, a shaft hole 55 that penetrates in a coaxial line below both sides, and a groove part 56 provided in a vertical direction on a back surface side of each leg part. Furthermore, the plate body 50 and the leg part 51 are formed flush with one another and are provided with a small protrusion 51a provided on a portion between the shaft part 53 and the shaft hole 55, and a small protrusion 51b provided on a portion that includes a periphery of the shaft hole 55. In a process where the second link 5 rotates with the shaft 59 inserted into the base side shaft hole 55 as a fulcrum, the small protrusions 51a and 51b make it easier to reduce frictional resistance and absorb rattling by making contact with, for example, an opposing part of the base 3.

Figure 10A:
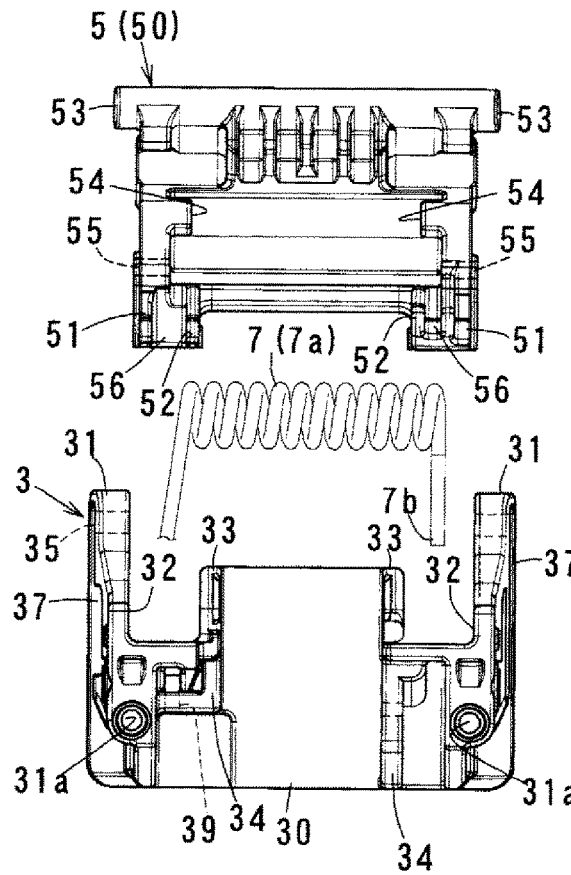
FIG. 10(a) illustrates a front surface view illustrating a relationship between a base, a second link, and a second spring body.
Figure 10B:
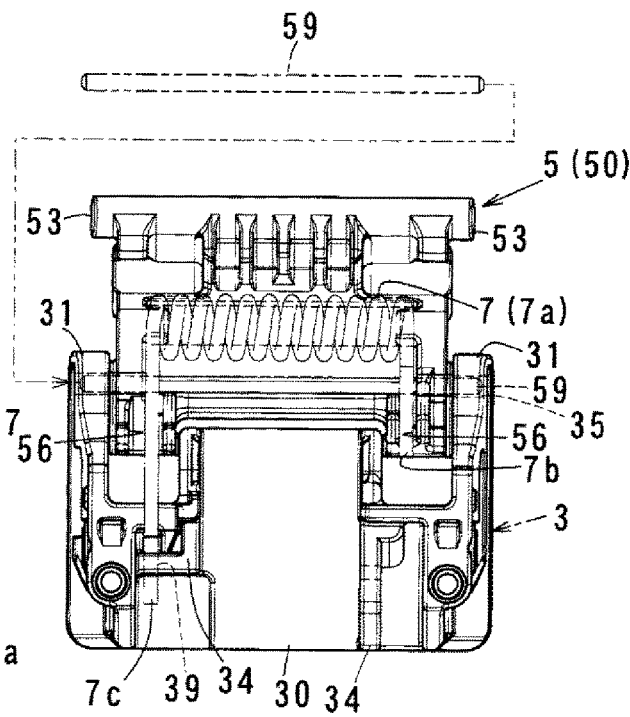
FIG. 10(b) illustrates a front surface view illustrating the relationship in an assembled state.
Figure 10C:
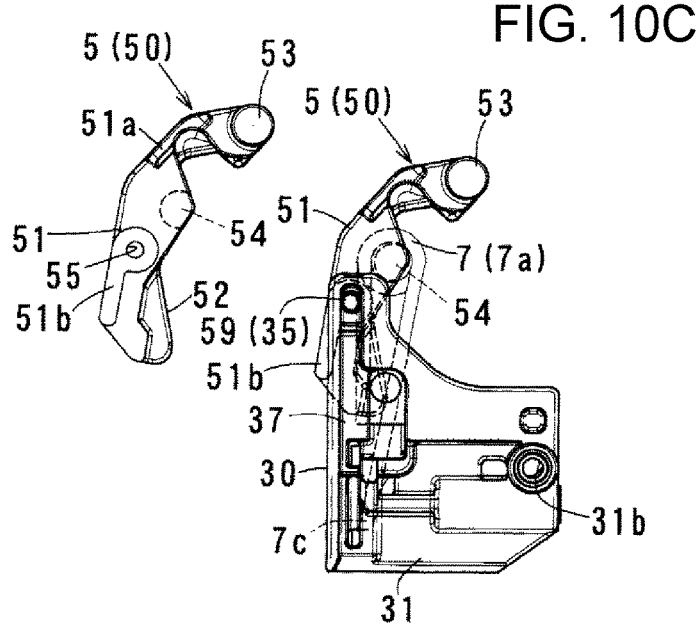
FIG. 10(c) illustrates a side surface view of the assembled state.

The second link 5 described above arranges a lower side of the plate body 50 and the leg part 51 between the two side walls 31 with respect to the base 3, and arranges each of the shaft holes 55 so as to overlap with the corresponding shaft hole 35. In that state, as illustrated in FIG. 10(b), the second link 5 is supported to rotate freely with the shaft 59 as a fulcrum when the shaft 59 is inserted into the shaft hole 35 and the shaft hole 55 on one side and the shaft hole 55 and the shaft hole 35 on the other side. The second spring body 7 is thus assembled between the second link 5 and the base 3. In other words, the second spring body 7 is a coil spring where, in a state where a coil part 7a is fitted onto and held by the shaft part 54 on both sides, one end 7b of a coil part is fitted into and regulated by the groove part 56 of one leg part, and the other end 7c of the coil part is fitted into and regulated by the fitting hole 39 on a base side and generates an urging force. Furthermore, with respect to the supporting body 25, each of the shafts 53 is fitted into and linked with the corresponding shaft hole 26b on the support body so as to rotate freely.

(Operation) The operation of the lid urging structure according to the invention as described above will be clarified with reference to FIG. 4 through FIG. 6(b), and FIG. 13.

(1) With the lid urging structure (reference symbol A in FIG. 13) according to the invention described above, in the closed position where an upper opening of the housing 1 is closed, the lid 2 is locked by the locking means 18 in a state biased in the closing direction, so there is no rattling. When the locking means 18 is unlocked, the lid 2 is pushed slightly in the opening direction by the push 17a of the push lifter against the urging force of the spring bodies 6 and 7, and opens slightly (in FIG. 13, the lid opening angle is about 6 degrees). From that state, a user grabs the lid 2 with fingers, or the like, and performs a rotating operation in the opening direction against the urging force. This process, as can be seen from FIG. 13, is different from a conventional one in that when the lid 2 is rotated slightly outwardly to the first position against the urging force, a spring stress momentarily becomes weak by being momentarily biased in the opening direction.

When the lid 2 is rotated to the second position (in FIG. 13, the lid opening angle is about 50 degrees) against the urging force, the urging direction of the spring bodies 6 and 7 reverses, and after that, the lid is rotated to the full-open position through links 4 and 5 by the urging force of the spring bodies 6 and 7. In this lid urging structure, as is illustrated in FIG. 13, the lid opening angle at the full-open position is about 118 degrees, and the lid is biased in the opening direction so that there is no rattling in the full-open position. Furthermore, with this lid urging structure A, bouncing when the lid is fully open is reduced because the lid is more firmly biased in the lid opening direction at the full-open position when compared to a lid urging structure B that uses only the second spring body 6 as an urging member. Note that, with the lid urging structure B, the first position, where the lid opening angle is 10 degrees, is a dead point for the first spring body 6. Furthermore, with a lid urging structure C, a lid opening angle of 48 degrees is a dead point for the second spring body 7.

(2) If the lid 2 is to be closed again, when the lid is rotated against the urging force from the full-open position to the second position, the urging direction reverses at the second position, and from there, the lid is rotated to the first position by the urging force through the linking members 4 and 5. After the lid 2 momentarily stops at the first position, the lid is rotated again to the closed position by the urging force of the spring bodies 6 and 7 through the links 4 and 5. In this way, by stopping the lid 2 momentarily at the first position, the lid urging structure A reduces a striking force against the push lifter 16, and is thus able to suppress the generation of flapping and abnormal sounds better than the comparison products lid urging structures C and C1 that rotate the lid from the second position right to the closed position in the conventional manner.

Furthermore, when compared to the comparison product B, where the first position is at a lid opening angle of 10 degrees, the lid opening angle with the lid urging structure A at the first position is larger, at about 25 degrees, due to an equilibrium of the spring bodies 6 and 7. Therefore, in an operation that closes the lid 2, after the lid is rotated from the second position in the closing direction by the urging force and stops momentarily at the first position, the lid is once again rotated in the closing direction by the urging force. With this process, if the lid opening angle at the first position is small at only about 10 degrees, as with the comparison product lid urging structure B, the lid is prone to hitting the push lifter 16 at high speed, rendering the lid difficult to use and impairing a sense of quality. By contrast, since the lid opening angle at the first position has been significantly modified to about 25 degrees in the lid urging structure A of the invention product, the structure can eliminate and mitigate such problems by reducing fluttering and tapping sounds, and is thus effective in providing a sense of quality and preventing finger pinching.

Figure 6A:
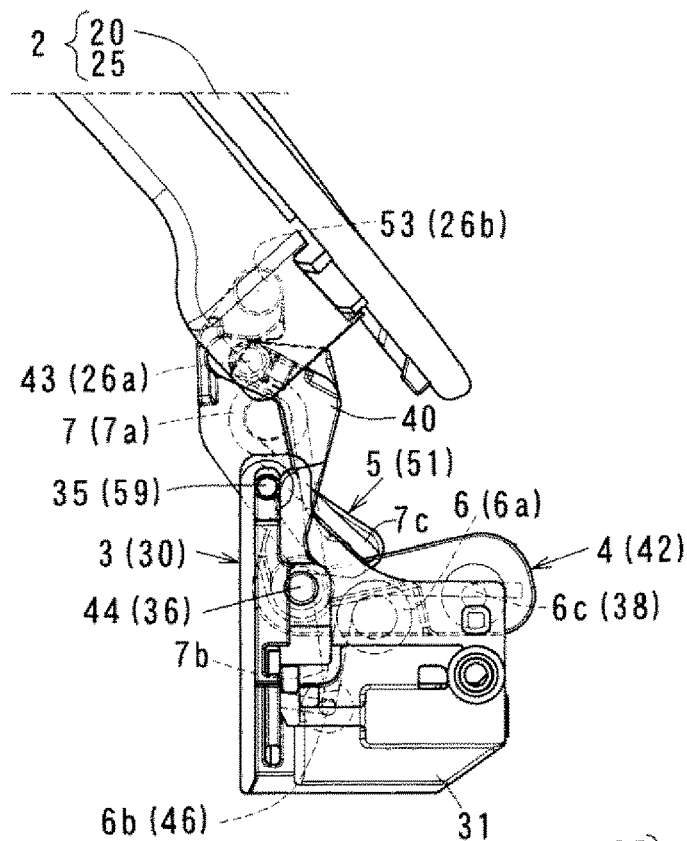
FIGS. 6(a) and 6(b) are magnified views schematically illustrating main components of a lid urging structure where
Figure 6B:
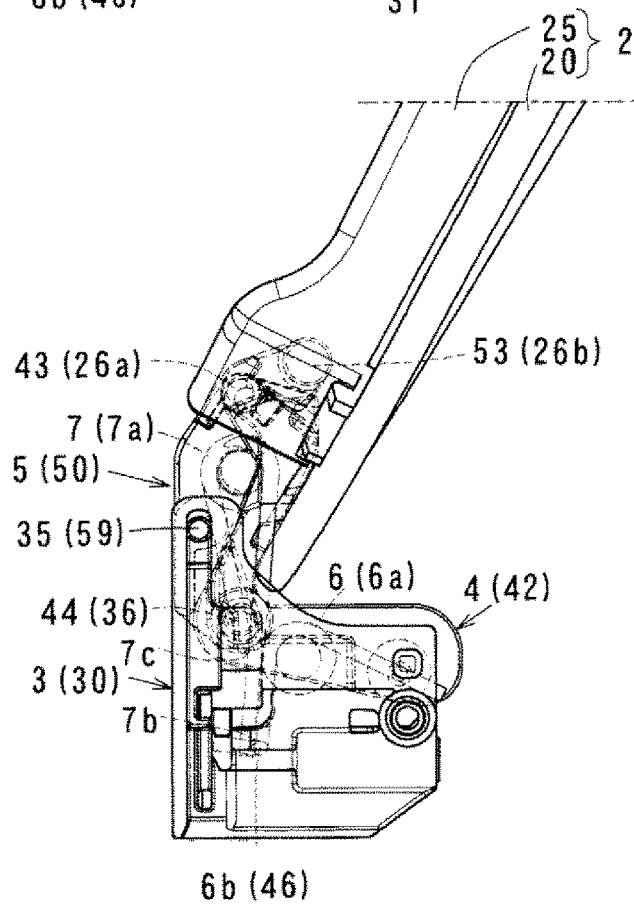
Figure 7:
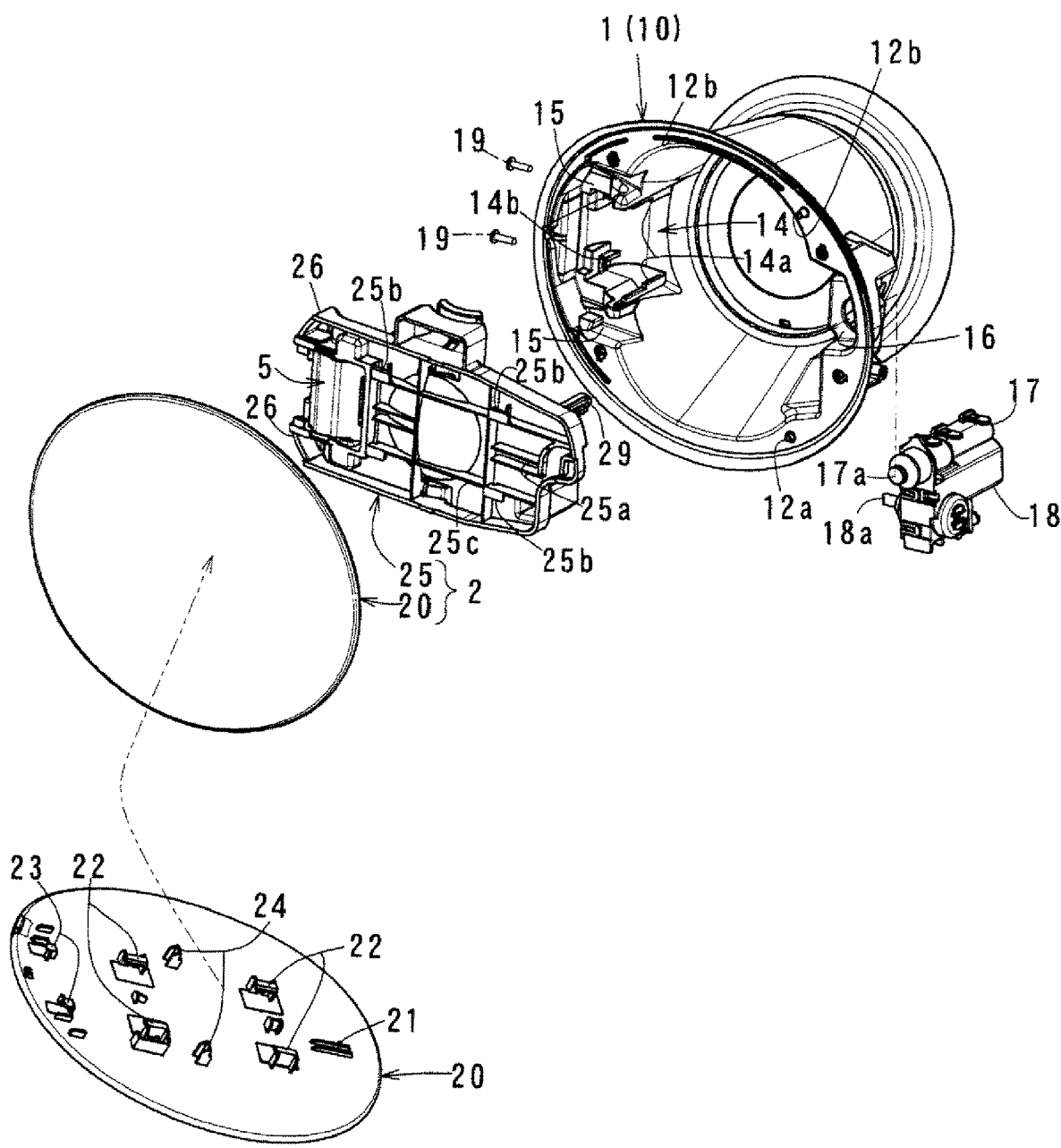
FIG. 7 is a schematic exploded view illustrating a relationship between the lid and a housing.

(3) The operations of both of the linking members 4 and 5 are similar to those of the two linking members in Patent Document 1, and by regulating and correcting an original opening and closing trajectory through the first link 4, using the second link 5 to make the opening and closing trajectory of the lid 2 more compact, the lid 2 can be controlled when opening and closing so as not to interfere with an outer panel 8. Furthermore, in this structure, with the lid 2 at the full-open position through the first and second links 4 and 5 as illustrated in FIG. 6(b), an upper side of the first link 4 abuts the inside in the "<" shape of the plate body 50 of the second link 5, and a base end edge part of the lid 2 abuts the middle plate part 40 of the first link 4. As a result, the lid 2 is held stably in the full-open position open at 118 degrees. Furthermore, because the first link 4 is hard to see due to being sandwiched by the lid 2 and the second link 5 in the full-open position in this structure, the structure looks good because the second link 5 arranges a flat design surface on a space side of the housing 1, and the design surface is nearly flush (a linked surface) with the back wall 30 of the base 3, which is integrally assembled to the housing 1, and with a corresponding part of the lid 2, and the like.

As described above, the lid urging structure according to the present invention may be modified in various ways, except for the requirements specified in the claims. For example, although a configuration where a refueling port was arranged in an opening inner part was illustrated as the housing 1, a configuration where an electric charging port is arranged in the opening inner part is also acceptable. Furthermore, although the lid body 20 was mounted to the supporting body 24 as the lid 2, a portion equivalent to the supporting body 24 may be formed integrally with the lid body 20. For example, a part corresponding to a base may be formed integrally with the housing as the base 3. The specific structure for pivotally supporting the housing or the base is not limited to this form and thus a configuration where the first and second links 4 and 5 are accomplished by having one end pivotally supported by a lid back side and the other end pivotally supported by the housing or the base is also possible.

REFERENCE NUMERALS

1 . . . Housing (10 is a cylindrical part)
2 . . . Lid (lid bodies 20 and 25 are supporting bodies)
3 . . . Base (30 is a main body, 31 is an outer wall, and 33 is an inner wall)
4 . . . First link (linking member: 40 is an upper plate part, and 42 is an arm part)
5 . . . Second link (linking member: 50 is a plate body, 51 is a leg part, and 56 is a groove part)
6 . . . First spring body (urging member: 6b is one end, and 6c is the other end)
7 . . . Second spring body (urging member: 7b is one end, and 7c is the other end)
8 . . . Outer panel
9 . . . Attaching frame
17 . . . Push lifter
18 . . . Locking means
34 . . . Wall part
36 . . . Shaft hole
38 . . . Fitting hole
39 . . . Fitting hole
43 . . . Shaft part
44 . . . Shaft part
46 . . . Fitting hole
53 . . . Shaft part
54 . . . Shaft part
55 . . . Shaft hole
59 . . . Shaft (pivot shaft)

Note that all of the content of the Specification, Scope of Claims, Drawings, and Abstract of Japanese Patent Application No. 2018-107393 submitted on Jun. 5, 2018 are cited herein, and have been incorporated as a disclosure of the Specification of the present invention.

What is claimed is:

1. A lid urging structure comprising:
a housing forming a space for a refueling port or an electric recharging port in an opening inner part;
a lid that is rotatably supported with respect to the housing, and is switched from a closed position where an opening of the housing is closed, to a first position that is partly open from the closed position, to a second position further in an opening direction and to a full-open position;
a first link and a second link with one end being pivotally supported by a back side of the lid and another end being pivotally supported by an inner side of the housing; and
an urging member that biases the lid in a closing direction at the closed position, and that is able to switch through an urging force from the second position toward the full-open position by reversing an urging direction when a rotation operation is Performed against the urging force from the closing direction toward the second position,
wherein the urging member includes a first spring body arranged between the first link and the housing and a second spring body arranged between the second link and the housing, and an equilibrium of each spring body is adjusted to have an operating force that rotates the lid from the closed position to the first position or a first position vicinity against the urging force and an urging force that rotates and biases the lid from the first position or the first position vicinity to the closed position, so that in an operation that closes the lid, after the lid is rotated from the second position in the closing direction by the urging force and stops momentarily at the first position, the lid is once again rotated in the closing direction by the urging force.

2. The lid urging structure according to claim 1, wherein by the first spring body and the second spring body, a lid opening angle is set at the first position larger than in a case where the first and second spring bodies are respectively used independently.

3. The lid urging structure according to claim 1, further comprising:
a base provided in the housing that pivotally supports the first link and the second link, and regulates an end part side corresponding to the spring body.

4. The lid urging structure according to claim 3, wherein the first link includes an upper plate part that is pivotally supported by the lid, a middle plate part that is linked to the upper plate part and pivotally supported by the base, and an arm part that is linked to the middle plate part in which a fitting hole is formed in a width direction, and
the first spring body is arranged between an inner wall of the base provided so as to face the arm part and the arm part with one end being regulated to fit into the fitting hole and another end being regulated to fit into a fitting hole provided on the inner wall.

5. The lid urging structure according to claim 4, wherein the second link includes a plate body pivotally supported by both the lid and the base, a pair of protruding leg parts to keep an interval on a lower side of the plate body, and a groove part provided on a back surface side of the leg parts, and
the second spring body is arranged on an inner surface side of the base with one end being regulated to fit into the groove part of one of the protruding leg parts and another end being regulated to fit into a fitting hole provided in the base and penetrating in a vertical direction.

6. The lid urging structure according to claim 1, wherein each of the first and second spring bodies is a coil spring.

7. The lid urging structure according to claim 1, wherein in the full-open position of the lid through the first and second links, an upper side of the first link abuts an inside in a bent shape of the second link, and a base end edge part of the lid abuts a middle plate part of the first link.

8. The lid urging structure according to claim 7, wherein second link includes a flat design surface arranged on a space side of the housing, and the design surface is flush with a back wall of the base.

* * * * *